United States Patent
Hu et al.

(10) Patent No.: US 12,250,606 B2
(45) Date of Patent: Mar. 11, 2025

(54) CELL CAMPING METHOD, RELATED DEVICE AND STORAGE MEDIUM

(71) Applicant: GUANGDONG OPPO MOBILE TELECOMMUNICATIONS CORP., LTD., Dongguan (CN)

(72) Inventors: Wujun Hu, Dongguan (CN); Lihai Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 351 days.

(21) Appl. No.: 17/865,009

(22) Filed: Jul. 14, 2022

(65) Prior Publication Data

US 2022/0361075 A1 Nov. 10, 2022

Related U.S. Application Data

(63) Continuation of application No. PCT/CN2021/070454, filed on Jan. 6, 2021.

(30) Foreign Application Priority Data

Jan. 17, 2020 (CN) .......................... 202010054722.0

(51) Int. Cl.
*H04W 80/04* (2009.01)
*H04W 36/08* (2009.01)
(Continued)

(52) U.S. Cl.
CPC ........... *H04W 36/26* (2013.01); *H04W 36/22* (2013.01); *H04W 48/20* (2013.01)

(58) Field of Classification Search
CPC ..... H04W 36/26; H04W 36/22; H04W 48/20; H04W 36/008355; H04W 36/008357; H04W 48/18; H04W 36/0085
(Continued)

(56) References Cited

U.S. PATENT DOCUMENTS

2018/0352508 A1* 12/2018 Fujishiro ............... H04W 76/10
2019/0373523 A1* 12/2019 Panchal ................ H04W 76/15
(Continued)

FOREIGN PATENT DOCUMENTS

| CN | 101547468 A | 9/2009 |
| CN | 104509167 A | 4/2015 |

(Continued)

OTHER PUBLICATIONS

Ericsson (R2-1712345, "cell-specific prioritization at reselection", Nov. 27-Dec. 1, 2017), (Year: 2017).*
(Continued)

*Primary Examiner* — Maharishi V Khirodhar
(74) *Attorney, Agent, or Firm* — Sheppard, Mullin, Richter & Hampton LLP

(57) ABSTRACT

The present disclosure provides a cell camping method, a related device, and a storage medium. The cell camping method includes: determining, by a network device, a cell where a terminal is camping and a corresponding camping state, the terminal being a terminal that supports a Non-Standalone networking (NSA) function; and transmitting a first indication to the terminal when the terminal is camping on a first cell and is in an idle state, the first indication indicating to the terminal that a reselection priority of the first cell is a first priority. The first priority is higher than or equal to a second priority, the second priority is a reselection priority of a second cell, and the first cell is an NSA anchor cell.

8 Claims, 4 Drawing Sheets

(51) Int. Cl.
  *H04W 36/14* (2009.01)
  *H04W 36/18* (2009.01)
  *H04W 36/22* (2009.01)
  *H04W 36/26* (2009.01)
  *H04W 48/20* (2009.01)

(58) Field of Classification Search
  USPC .......................................................... 370/331
  See application file for complete search history.

(56) References Cited

U.S. PATENT DOCUMENTS

2020/0037387 A1* 1/2020 Lee ....................... H04W 48/16
2021/0007025 A1* 1/2021 Kumar .............. H04W 36/0058

FOREIGN PATENT DOCUMENTS

| CN | 108024299 | A |   | 5/2018 |   |
|----|-----------|---|---|--------|---|
| CN | 109451880 | A |   | 3/2019 |   |
| CN | 109561500 | A |   | 4/2019 |   |
| CN | 110324822 | A |   | 10/2019 |  |
| CN | 110636569 | A |   | 12/2019 |  |
| CN | 111263415 | A |   | 6/2020 |   |
| EP | 4057683   | A1 | * | 9/2022 | ............ H04W 24/10 |
| WO | 2019058092 | A1 |  | 3/2019 |   |
| WO | 2022056810 | A1 |  | 3/2022 |   |

OTHER PUBLICATIONS

International Search Report and Written Opinion dated Mar. 29, 2021 in International Application No. PCT/CN2021/070454. English translation attached.
Ericsson. "Handling RAT priorities in low frequency NR deployment scenarios", 3GPP TSG-RAN WG2 #103 R2-1812279, Aug. 24, 2018(Aug. 24, 2018), entire document.
First Office Action from corresponding Chinese Application No. 202010054722.0, dated Feb. 1, 2021. English translation attached.
The Second Office Action from corresponding Chinese Application No. 202010054722.0, dated May 19, 2021 . English translation attached.
The grant Notice from corresponding Chinese Application No. 202010054722.0, dated Aug. 30, 2021 . English translation attached.
Extended European Search Report dated May 16, 2023 received in European Patent Application No. EP 21741570.2.
CMCC et al: "Further consideration on EN-DC cell reselection" 3GPP Draft; R2-1915219, 3rd Generation Partnership Project (3GPP), Mobile Competence Centre ; 650, Route Des Lucioles ; F-06921 Sophia-Antipolis Cedex ; France vol. RAN WG2, No. Reno ; USA; Nov. 18, 2019-Nov. 22, 2019 ; Nov. 18, 2019 (Nov. 8, 2019), XP051817102, 3 pages.

* cited by examiner

CELL CAMPING METHOD, RELATED DEVICE AND STORAGE MEDIUM

CROSS REFERENCE TO RELATED APPLICATIONS

The present disclosure is a continuation of International Application No. PCT/CN2021/070454 filed on Jan. 6, 2021, which is based on and claims priority to Chinese Application No. 202010054722.0, filed on Jan. 17, 2020, the contents of which are incorporated herein by reference in their entireties.

TECHNICAL FIELD

The embodiments of the present disclosure relate to communication technology, and more particularly, to a cell camping method, a related device, and a storage medium.

BACKGROUND

Non-Standalone (NSA) networking uses the existing 4th Generation of Cellular Mobile Communications (4G) infrastructure to deploy the 5th Generation of Cellular Mobile Communications (5G). In the related art, when a terminal camps on an NSA anchor cell, there is a problem that the terminal may easily reselect a cell that only supports Long Term Evolution (LTE) (LTE-only cell).

SUMMARY

In view of the above, the embodiments of the present disclosure provide a cell camping method, a related device, and a storage medium, capable of at least solving the problem in the related art that a terminal may easily reselect an LTE-only cell when camping on an NSA anchor cell.

The technical solutions of the embodiments of the present disclosure are implemented as follows.

An embodiment of the present disclosure provides a cell camping method. The method includes: determining a cell where a terminal is camping and a corresponding camping state, the terminal being a terminal that supports a Non-Standalone networking (NSA) function; and transmitting a first indication to the terminal when the terminal is camping on a first cell and is in an idle state, the first indication indicating to the terminal that a reselection priority of the first cell is a first priority. The first priority is higher than or equal to a second priority, the second priority is a reselection priority of a second cell, and the first cell is an NSA anchor cell.

Here, in the above solution, the method may further include: determining, when the terminal is camping on the second cell and is in a connected state, a first parameter of the first cell, the first parameter representing a congestion condition of the first cell; and redirecting, when the first parameter of the first cell satisfies a corresponding parameter threshold, the terminal to the first cell.

In the above solution, the operation of determining the first parameter of the first cell may include: determining a first number corresponding to the first cell, the first number being a number of terminals currently accessing the first cell; determining a second number corresponding to the first cell, the second number being a maximum number of terminals allowable to access the first cell; and determining the first parameter of the first cell based on the first number and the second number.

In the above solution, the method may further include: detecting, when the terminal is camping on the first cell and is in a connected state, a signal quality of the terminal to obtain a detection result; and redirecting the terminal to the second cell when the detection result indicates that the signal quality is lower than a predetermined threshold for a time length exceeding a first predetermined time length.

In the above solution, the method may further include: when the terminal is redirected to the second cell: prohibiting the terminal from reselecting the first cell within a second predetermined time length; or refraining from redirecting the terminal to the first cell within the second predetermined time length.

In the above solution, the operation of determining the cell where the terminal is camping and the corresponding camping state may include: searching a predetermined list to determine whether the terminal supports the NSA function, to obtain a search result, the predetermined list recording support of the NSA function by each terminal within a coverage of a network device; and determining the cell where the terminal is camping and the corresponding camping state when the search result indicates that the terminal supports the NSA function.

An embodiment of the present disclosure provides a cell camping method. The method includes: determining, by a terminal, a cell where the terminal is camping and a corresponding camping state, the terminal being a terminal that supports a Non-Standalone networking (NSA) function; and modifying, by the terminal when the terminal is camping on a first cell and is in an idle state, a reselection priority of the first cell into a first priority. The first priority is higher than or equal to a second priority, the second priority is a reselection priority of a second cell, and the first cell is an NSA anchor cell.

Herein, in the above solution, the operation of modifying, by the terminal, the reselection priority of the first cell into the first priority may include: receiving, by the terminal, a first indication transmitted by a network device, the first indication indicating to the terminal that the reselection priority of the first cell is the first priority; and modifying, by the terminal, the reselection priority of the first cell into the first priority according to the first indication.

In the above solution, the operation of modifying, by the terminal, the reselection priority of the first cell into the first priority may further include: triggering, by the terminal, a modification operation without receiving the first indication, to modify the reselection priority of the first cell into the first priority.

In the above scheme, the method may further include: modifying, by the terminal, the reselection priority of the first cell into the first priority in response to the terminal detecting neighbor information about the first cell while the terminal is camping on the second cell and is in an idle state.

An embodiment of the present disclosure provides a network device. The network device includes: a first determining unit configured to determine a cell where a terminal is camping and a corresponding camping state, the terminal being a terminal that supports a Non-Standalone networking (NSA) function; and a transmitting unit configured to transmit a first indication to the terminal when the terminal is camping on a first cell and is in an idle state, the first indication indicating to the terminal that a reselection priority of the first cell is a first priority. The first priority is higher than or equal to a second priority, the second priority is a reselection priority of a second cell, and the first cell is an NSA anchor cell.

An embodiment of the present disclosure provides a terminal. The terminal includes: a second determining unit configured to determine a cell where the terminal is camping and a corresponding camping state, the terminal being a terminal that supports a Non-Standalone networking (NSA) function; and a modifying unit configured to modify, when the terminal is camping on a first cell and is in an idle state, a reselection priority of the first cell into a first priority. The first priority is higher than or equal to a second priority, the second priority is a reselection priority of a second cell, and the first cell is an NSA anchor cell.

An embodiment of the present disclosure provides a network device. The network device includes: a first communication interface, a first processor, and a first memory having a computer program stored thereon and executable by the first processor. The first processor is configured to, when executing the computer program, perform the steps corresponding to any of the above methods on the network device side. The first communication interface is configured to, under control of the first processor, perform the steps corresponding to the above methods on the network device side.

An embodiment of the present disclosure provides a terminal. The terminal includes: a second communication interface, a first processor, and a first memory having a computer program stored thereon and executable by the second processor. The second processor is configured to, when executing the computer program, perform the steps corresponding to any of the above methods on the terminal side. The first communication interface is configured to, under control of the first processor, perform the steps corresponding to the above methods on the terminal side.

An embodiment of the present disclosure further provides a storage medium. The storage medium has a computer program stored thereon. The computer program, when executed by a processor, implementing the steps of any of the above methods.

With the embodiments of the present disclosure, according to the cell where the terminal supporting the NSA function is camping and the corresponding camping state, when the terminal is camping on the NSA anchor cell, the network device transmits an indication to the terminal to raise the reselection priority corresponding to the NSA anchor cell on the terminal side, so as to avoid the situation where the terminal reselects an LTE-only cell due to the low reselection priority corresponding to the NSA anchor cell. In this way, the terminal supporting the NSA function can preferentially camp on the NSA anchor cell, which optimizes the network experience of the terminal.

DESCRIPTION OF EMBODIMENTS

Figure 1:
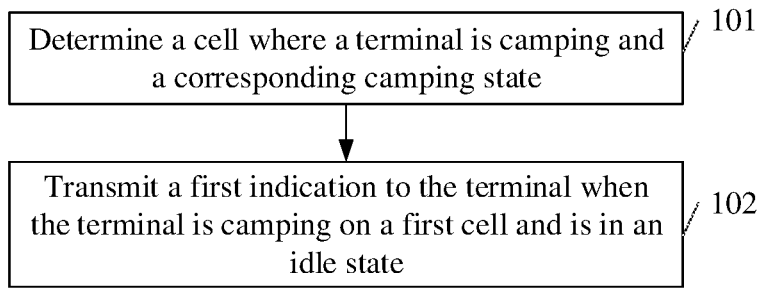
FIG. 1 is a schematic flowchart showing an implementation of a cell camping method on a network device side according to an embodiment of the present disclosure.

The present disclosure will be described in further detail below with reference to the accompanying drawings and specific embodiments.

In the following description, for the purpose of illustration rather than limiting, specific details such as specific system structures and technologies will be set forth in order to provide a thorough understanding of the embodiments of the present disclosure. However, it will be apparent to those skilled in the art that the present disclosure may be practiced in other embodiments without these specific details. In other cases, detailed descriptions of well-known systems, devices, and methods are omitted so as not to obscure the description of the present disclosure with unnecessary details.

It should be noted that the technical solutions described in the embodiments of the present disclosure may be combined arbitrarily, provided that they do not conflict.

In addition, in the examples of the present disclosure, the terms "first", "second", etc. are used to distinguish similar objects from each other, and are not necessarily used to describe a specific order or sequence.

The 5G network architecture includes standalone (SA) and NSA networking modes. Here, SA refers to newly building a 5G network, including new base stations, backhaul links and core networks, while NSA refers to using existing 4G network infrastructures to deploy a 5G network. In the NSA networking mode, the 5G carrier only carries user data, and its control signaling is still transmitted through the 4G network. Since in the NSA networking mode the 5G New Radio (NR) is added based on the LTE network, there is a mixed networking scenario of LTE-only cells and NSA anchor cells. In the related art, when a terminal that supports the NSA function is powered on in this scenario, the terminal cannot register to the NSA anchor cell preferentially. In addition, it is desired by the network side that terminals that do not support the NSA function would not access the NSA anchor cell if possible. Therefore, the reselection priority configured for the NSA anchor cell on the network side is lower than the reselection priority configured for the LTE-only cell. In this way, when the terminal camps on an NSA anchor cell, it will reselect an LTE-only cell for camping according to the reselection priority, and cannot camp on the NSA anchor cell preferentially.

Based on the above, in the embodiments of the present disclosure, according to the cell where the terminal supporting the NSA function is camping and the corresponding camping state, when the terminal is camping on the NSA anchor cell, the network device transmits an indication to the terminal to raise the reselection priority corresponding to the NSA anchor cell on the terminal side, so as to avoid the situation where the terminal reselects an LTE-only cell due to the low reselection priority corresponding to the NSA anchor cell. In this way, the terminal supporting the NSA function can preferentially camp on the NSA anchor cell, which optimizes the network experience of the terminal.

The present disclosure will be described in further detail below with reference to the accompanying drawings and specific embodiments.

FIG. 1 shows an implementation process of a cell camping method according to an embodiment of the present disclosure. The method is performed by a network device, such as a base station. The method includes the following steps.

At step 101: a cell where a terminal is camping and a corresponding camping state are determined.

Here, the terminal is a terminal that supports an NSA networking function.

Here, the cell where the terminal is camping may be a first cell or a second cell. The first cell is an NSA anchor cell and supports the NSA function. The second cell may be an LTE-only cell, which only supports LTE. For the purpose of illustration, in the description of the embodiments below, the second cell is described as an LTE-only cell as an example. When a terminal is camping on a cell, the corresponding camping state may include an idle state and a connected state. When the terminal completes its camping on the cell, the terminal enters the idle state. If the terminal completes a random access process in the cell later, then the terminal enters the connected state.

In an embodiment, the operation of determining the cell where the terminal is camping and the corresponding camping state may include: searching a predetermined list to determine whether the terminal supports the NSA function, to obtain a search result; and determining the cell where the terminal is camping and the corresponding camping state when the search result indicates that the terminal supports the NSA function.

Here, the predetermined list is maintained at the network device, and the predetermined list records support of the NSA function by each terminal within the coverage of the network device. The network device distinguishes terminals that support the NSA function and terminals that do not support the NSA function within its coverage area based on the records in the predetermined list.

In practical applications, when the terminal is powered on within the coverage of the network device, it can indicate to the network device whether the terminal supports the NSA capability via a UECapabilityInformation message.

At step 102, when the terminal is camping on the first cell and is in the idle state, a first indication is transmitted to the terminal.

The first indication indicates to the terminal that a reselection priority of the first cell is a first priority. The first priority is higher than or equal to the second priority. Here, the second priority is a reselection priority configured by the network device for the second cell, that is, a reselection priority configured by the network device for the LTE-only cell. According to the protocol, the reselection priority of the LTE cell has a value in [0, 1, . . . , 7], with 0 being the lowest reselection priority and 7 being the highest reselection priority. In practical applications, in order to prevent a large number of terminals that do not support the NSA function from accessing the NSA anchor cell, the reselection priority of the NSA anchor cell is typically set to 3 or 4, and the reselection priority of the LTE-only cell is typically set to 5, 6, or 7. Therefore, the reselection priority of the NSA anchor cell needs to be raised on the terminal side, such that the reselection priority of the NSA anchor cell is higher than or equal to the reselection priority of the LTE-only cell.

In practical applications, the network device may transmit a Radio Resource Control (RRC) message to the terminal, and by including the first indication in the RRC message, indicate the reselection priority of the NSA anchor cell to the terminal to prevent the terminal camping on the NSA anchor cell from reselecting from the low-priority NSA anchor cell to the high-priority LTE-only cell. In this way, when the terminal is camping on the NSA anchor cell, it can keep camping on the NSA anchor cell for as long as possible while it is in the coverage of the NSA anchor cell, thereby optimizing the terminal's camping experience.

In an embodiment, when the RRC message transmitted by the network device does not carry the above first indication, the terminal may trigger a modification operation locally at the terminal to modify the locally maintained list of reselection priorities of cells, thereby modifying the reselection priority of the NSA anchor cell in the list to be higher than or equal to the reselection priority of the LTE-only cell.

Figure 2:
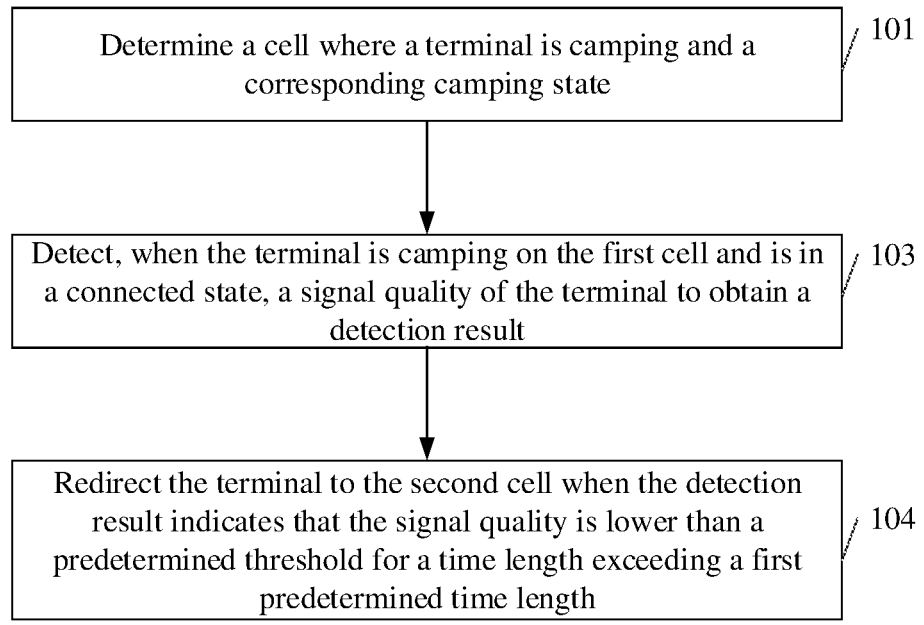
FIG. 2 is a schematic flowchart showing an implementation of a cell camping method on a network device side according to another embodiment of the present disclosure.

In an embodiment, as shown in FIG. 2, the method may further include the following steps.

At step 103, when the terminal is camping on the first cell and is in a connected state, a signal quality of the terminal is detected to obtain a detection result.

After the terminal camps on the NSA anchor cell, if the terminal initiates a random access procedure in the NSA anchor cell and enters the connected state, the network device can detect the signal quality of the signal received from terminal. In practical applications, the network device can detect Reference Signal Receiving Power (RSRP) or Reference Signal Receiving Quality (RSRQ) of the signal received from the terminal.

At step 104, the terminal is redirected to the second cell when the detection result indicates that the signal quality is lower than a predetermined threshold for a time length exceeding a first predetermined time length.

In practical applications, the redirection is performed by the network device for indicating to the terminal information such as a frequency of a target cell via an RRC Connection Release message. Upon receiving the RRC Connection Release message, the terminal leaves the connected state and attempts to camp on the target cell according to the indication in the RRC Connection Release message.

Here, according to the detection result obtained by the network device by detecting the signal quality of the signal received from the terminal, when the signal quality of the signal from the terminal is lower than the corresponding threshold for a time length exceeding the first predetermined time length, it indicates that the NSA anchor cell is highly congested or has a low signal strength or signal quality. In this case, the network device can redirect the terminal to the LTE-only cell to ensure the communication quality of the terminal.

In an embodiment, when the terminal is redirected to the second cell, the method may further include: prohibiting the terminal from reselecting the first cell within a second predetermined time length; or refraining from redirecting the terminal to the first cell within the second predetermined time length.

On the basis of the above embodiment, once the network device redirects the terminal from the NSA anchor cell to the LTE-only cell, within the second predetermined time, the network device will not support the terminal to reselect from the LTE-only cell back to the NSA anchor cell, and the network device will not redirect the terminal from the LTE-only cell back to the NSA anchor cell, so as to prevent the terminal from being handed over back and forth between the LTE-only cell and the NSA anchor cell due to significant changes in the signal strength of the cell.

In practical applications, when the terminal wants to reselect from the LTE-only cell to the NSA anchor cell, it will initiate a measurement request to the network device. In this case, the network device can prevent the terminal from reselecting from the LTE-only cell back to the NSA anchor cell by not responding to the measurement request.

Figure 3:
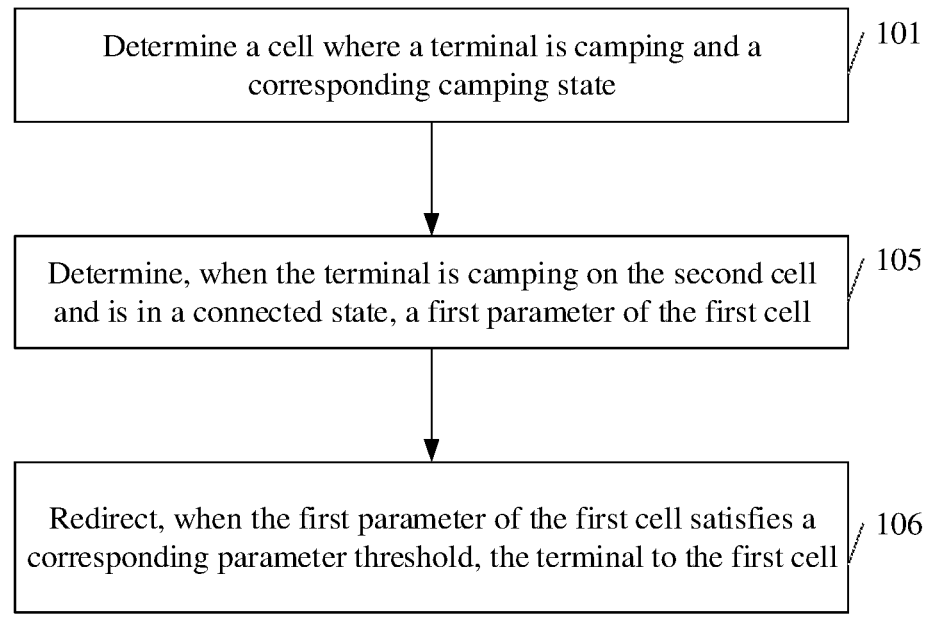
FIG. 3 is a schematic flowchart showing an implementation of a cell camping method on a network device side according to yet another embodiment of the present disclosure.

In an embodiment, after the network device determines the cell where the terminal is camping and the corresponding camping state, as shown in FIG. 3, the method may further include the following steps.

At step 105, when the terminal is camping on the second cell and is in a connected state, a first parameter of the first cell is determined.

Here, the first parameter represents a congestion condition of the first cell.

Here, for the case where the terminal is camping on the LTE-only cell and is in the connected state, the network device can determine the congestion condition of the NSA anchor cell.

In an embodiment, the operation of determining the first parameter of the first cell may include: determining a first number corresponding to the first cell, the first number being a number of terminals currently accessing the first cell; determining a second number corresponding to the first cell, the second number being a maximum number of terminals allowable to access the first cell; and determining the first parameter of the first cell based on the first number and the second number.

In practical applications, the ratio of the first number to the second number can be used to represent the congestion condition of the NSA anchor cell. That is, the ratio of the first number to the second number can be used as the first parameter of the NSA anchor cell.

In addition, in practical applications, the congestion condition of the NSA anchor cell can be represented by a parameter related to a service load on the network device. For example, a ratio of a bandwidth occupied by the current accessing terminal in the network device to a maximum bandwidth of the network device may be used as the first parameter to represent the congestion condition of the NSA anchor cell.

At step 106, when the first parameter of the first cell satisfies a corresponding parameter threshold, the terminal is redirected to the first cell.

In practical applications, the corresponding parameter threshold may be set for the first parameter. For example, when the ratio of the first number to the second number is used as the first parameter of the NSA anchor cell, the corresponding parameter threshold can be set to 0.9. When the value of the first parameter is greater than or equal to 0.9, the NSA anchor cell is considered to be congested, and when the value of the first parameter is smaller than 0.9, it is considered that the congestion in the corresponding NSA anchor cell is within an acceptable range.

Here, when the value of the first parameter satisfies the corresponding parameter threshold, for example, when the value of the first parameter in the above example is smaller than 0.9, the network device may redirect the terminal to the NSA anchor cell.

It is to be noted that in the related art, the network device will redirect the terminal to a target cell only when the signal quality or signal strength of the target cell satisfies a corresponding threshold. Therefore, here, when the network device redirects the terminal to the NSA anchor cell, the signal quality or signal strength corresponding to the NSA anchor cell necessarily satisfies the corresponding threshold by default. For example, the threshold corresponding to RSRP may be typically −115 dBm, and the threshold corresponding to RSRQ may be typically −10 dBm. Therefore, in addition to satisfying the condition that the value of the first parameter is smaller than 0.9, the NSA anchor cell also needs to satisfy the condition that the RSRP value is greater than −115 dBm, or the RSRQ value is greater than −10 dBm, such that the network device can redirect the terminal to the NSA anchor cell. In addition, in practical applications, a Block Error Rate (BLER) may also be used as a threshold that needs to be satisfied for cell redirection.

In practical applications, the network device may redirect the terminal to the NSA anchor cell in the following two different scenarios. In Scenario 1, the terminal is located in an area covered by both the NSA anchor cell and the LTE-only cell, and the terminal is camping on the LTE-only cell. In Scenario 2, the terminal moves from an area covered only by the LTE-only cell to an area covered only by the NSA anchor cell. In the above two scenarios, as long as the congestion condition of the NSA anchor cell satisfies the corresponding parameter threshold, when the signal quality or signal strength of the NSA anchor cell also satisfies the corresponding threshold, the network device can redirect the terminal to the NSA anchor cell according to the above solution.

In addition, in an embodiment, the terminal is camping on the LTE-only cell and is in the idle state, if the neighboring cell configured for the LTE-only cell is an NSA anchor cell, the terminal can detect the neighboring cell information about the NSA anchor cell, and then modify the list of reselection priorities of cells maintained locally to modify the reselection priority of the NSA anchor cell in the list to be higher than or equal to that of the LTE-only cell. In this way, when the signal quality or signal strength of the NSA anchor cell satisfies the corresponding threshold, the terminal can be handed over to the NSA anchor cell by means of reselection.

Figure 4:
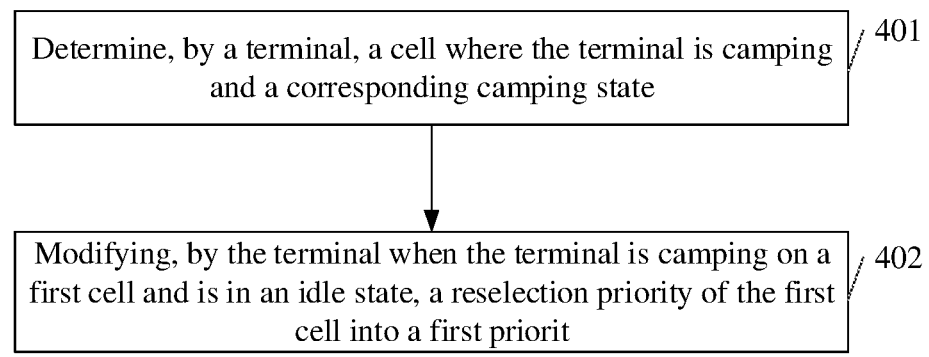
FIG. 4 is a schematic flowchart showing an implementation of a cell camping method on a terminal side according to an embodiment of the present disclosure.

FIG. 4 shows an implementation process of a cell camping method according to another embodiment of the present disclosure. The method is performed by a terminal that supports the NSA function. In practical applications, when the terminal is powered on within the coverage of a network device, it can indicate to the network device whether the terminal supports the NSA capability via a UECapability-Information message.

The method includes the following steps.

At step 401, the terminal determines a cell where the terminal is camping and a corresponding camping state.

Here, the cell where the terminal is camping may be a first cell or a second cell. The first cell is an NSA anchor cell and supports the NSA function. The second cell may be an LTE-only cell, which only supports LTE. When a terminal is camping on a cell, the corresponding camping state may include an idle state and a connected state. When the terminal completes its camping on the cell, the terminal enters the idle state. If the terminal completes a random access process in the cell later, then the terminal enters the connected state.

At step 402, when the terminal is camping on the first cell and is in the idle state, the terminal modifies a reselection priority of the first cell into a first priority.

Here, the first priority is higher than or equal to the second priority, and the second priority is a reselection priority configured by the network device for the LTE-only cell. According to the protocol, the reselection priority of the LTE cell has a value in [0, 1, . . . , 7], with 0 being the lowest reselection priority and 7 being the highest reselection priority. In practical applications, in order to prevent a large number of terminals that do not support the NSA function from accessing the NSA anchor cell, the reselection priority of the NSA anchor cell is typically set to 3 or 4, and the reselection priority of the LTE-only cell is typically set to 5, 6, or 7. Here, the terminal raises the reselection priority of the NSA anchor cell by modifying the reselection priority of the NSA anchor cell locally at the terminal, such that the reselection priority of the NSA anchor cell is higher than or equal to the reselection priority of the LTE-only cell. In this way, when the terminal is camping on the NSA anchor cell, as long as it is in the coverage of the NSA anchor cell, it would not reselect from the low-priority NSA anchor cell to the high-priority LTE-only cell as a result of the reselection priority of the NSA anchor cell being lower than the reselection priority of the LTE-only cell. Thus, the terminal can camp on the NSA anchor cell for as long as possible, thereby optimizing the terminal's network experience.

In an embodiment, the terminal modifying the reselection priority of the first cell into the first priority may include: receiving, by the terminal, a first indication transmitted by a network device, the first indication indicating to the terminal that the reselection priority of the first cell is the first priority; and modifying, by the terminal, the reselection priority of the first cell into the first priority according to the first indication.

In practical applications, the network device may transmit an RRC message to the terminal, and include a first indication in the RRC message. The first indication may indicate to the terminal that the reselection priority of the NSA anchor cell where the terminal is camping is the first priority. Upon receiving the RRC message, according to the first indication in the RRC message, the terminal can modify the locally maintained list of reselection priorities of cells, to modify the reselection priority of the NSA anchor cell in the list to be higher than or equal to the reselection priority of the LTE-only cell.

In an embodiment, the terminal modifying the reselection priority of the first cell into the first priority may further include: triggering, by the terminal, a modification operation without receiving the first indication, to modify the reselection priority of the first cell into the first priority.

Here, based on the above embodiment, when the RRC message transmitted by the network device does not carry the above first indication, the terminal may trigger a modification operation locally at the terminal to modify the locally maintained list of reselection priorities of cells, thereby modifying the reselection priority of the NSA anchor cell in the list to be higher than or equal to the reselection priority of the LTE-only cell.

In an embodiment, the method may further include: modifying, by the terminal, the reselection priority of the first cell into the first priority in response to the terminal detecting neighbor information about the first cell while the terminal is camping on the second cell and is in an idle state.

Here, the terminal is camping on the LTE-only cell and is in the idle state, if the neighboring cell configured for the LTE-only cell is an NSA anchor cell, the terminal can detect the neighboring cell information about the NSA anchor cell, and then modify the list of reselection priorities of cells maintained locally to modify the reselection priority of the NSA anchor cell in the list to be higher than or equal to that of the LTE-only cell. In this way, when the signal quality or signal strength of the NSA anchor cell satisfies the corresponding threshold, the terminal can be handed over to the NSA anchor cell by means of reselection.

The cell camping method according to the embodiment of the present disclosure will be further described below in conjunction with application embodiments.

In this application embodiment, the network device is a base station supporting the NSA function. Within the coverage of the base station, there are LTE-only cells A, B, and C, and an NSA anchor cell D. Cell A and Cell B are neighboring cells of Cell D.

First, when a User Equipment (UE) that supports the NSA function is powered on within the coverage of the base station, the UE reports to the base station that the UE supports the NSA function via a UECapabilityInformation message, and the base station records that the UE supports the NSA function in a predetermined list.

Scenario A: The UE does not identify Cell D, the UE initiates registration with Cell A, and camps on Cell A once the registration succeeds.

1. The UE camps on Cell A and is in the connected state. The base station detects that the current congestion level and signal quality of Cell D satisfy corresponding parameter thresholds, and redirects the UE to Cell D. After the UE camps on Cell D by means of redirection, the UE locally raises the reselection priority of Cell D in response to an RRC message transmitted by the base station, so as to prevent reselection of Cell A or Cell B with a higher reselection priority.

2. The UE camps on Cell A and is in the idle state. Since Cell A is configured with neighbor information about Cell D, and the UE detects the neighbor information about Cell D, the UE autonomously raises the reselection priority of Cell D locally in the UE. In this way, once the UE detects that Cell D satisfies a corresponding signal quality threshold, the UE reselects Cell D for camping. Since the reselection priority of cell D is raised, after the UE reselects Cell D for camping, it will not reselect back Cell A or Cell B again as the reselection priority of cell D is lower.

Scenario B: The UE identifies Cell D, the UE initiates registration with Cell D, and camps on Cell D once the registration succeeds.

1. The UE camps on Cell D and is in the connected state. The base station detects that the signal quality of the UE is lower than a corresponding threshold for a time period longer than T1, and the base station redirects the UE to Cell A, Cell B or Cell D. Within a time period T2, the base station does not supports reselection of the UE to Cell D or redirection of the UE to Cell D.

2. The UE camps on Cell D and is in the idle state. The UE raises the reselection priority of Cell D locally at the UE in response to an RRC message transmitted by the base station. Alternatively, without receiving any instruction to modify the reselection priority transmitted by the base station, the UE can autonomously raise the reselection priority of Cell D locally at the UE to prevent reselection of Cell A or Cell B with a higher reselection priority.

Scenario C: The UE camps on Cell C and moves from the coverage of Cell C to the coverage of Cell D. Since Cell C and Cell D are not neighboring cells, the system message of Cell C does not configure any information about Cell D and thus the UE cannot reselect Cell D. In this case, the base station detects that the current congestion level and signal quality of Cell D satisfy corresponding parameter thresholds, and redirects the UE to Cell D. Here, the redirection by the base station is blind, i.e., without the need for the UE to report measurement information, and the base station directly redirects the UE from Cell C to Cell D according to relationships of the cells in the network deployment.

Figure 5:
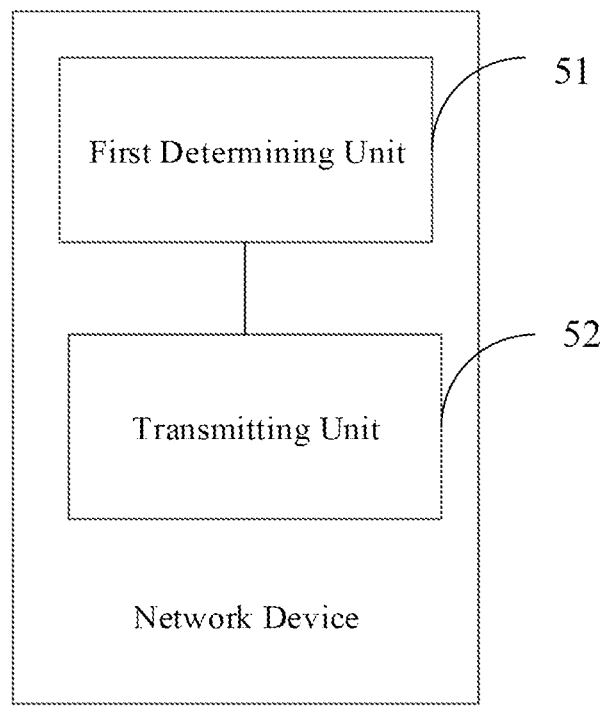
FIG. 5 is a schematic diagram showing a structure of a network device according to an embodiment of the present disclosure.

In order to implement the cell camping method of the embodiment of the present disclosure, an embodiment of the present disclosure further provides a network device. As shown in FIG. 5, the network device includes: a first determining unit 51 configured to determine a cell where a terminal is camping and a corresponding camping state, the terminal being a terminal that supports an NSA networking function; and a transmitting unit 52 configured to transmit a first indication to the terminal when the terminal is camping on a first cell and is in an idle state, the first indication indicating to the terminal that a reselection priority of the first cell is a first priority.

Here, the first priority is higher than or equal to a second priority, the second priority is a reselection priority of a second cell, and the first cell is an NSA anchor cell.

In an embodiment, the device may further include: a third determining unit configured to determine when the terminal is camping on the second cell and is in a connected state, a first parameter of the first cell, the first parameter representing a congestion condition of the first cell; and a first redirecting unit configured to redirect, when the first parameter of the first cell satisfies a corresponding parameter threshold, the terminal to the first cell.

In an embodiment, the third determining unit being configured to determine the first parameter of the first cell may include the third determining unit being configured to: determine a first number corresponding to the first cell, the first number being a number of terminals currently accessing the first cell; determine a second number corresponding to the first cell, the second number being a maximum number of terminals allowable to access the first cell; and determine the first parameter of the first cell based on the first number and the second number.

In an embodiment, the device may further include: a detection unit configured to detect, when the terminal is camping on the first cell and is in a connected state, a signal quality of the terminal to obtain a detection result; and a second redirecting unit configured to redirect the terminal to the second cell when the detection result indicates that the signal quality is lower than a predetermined threshold for a time length exceeding a first predetermined time length.

In an embodiment, when redirecting the terminal to the second cell, the second redirecting unit is further configured to: prohibit the terminal from reselecting the first cell within a second predetermined time length; or refrain from redirecting the terminal to the first cell within the second predetermined time length.

In an embodiment, the first determining unit may be configured to: search a predetermined list to determine whether the terminal supports the NSA function, to obtain a search result, the predetermined list recording support of the NSA function by each terminal within a coverage of a network device; and determine the cell where the terminal is camping and the corresponding camping state when the search result indicates that the terminal supports the NSA function.

In practical applications, the first determining unit 51, the third determining unit and the detecting unit may be implemented by a processor in the network device, and the transmitting unit 52, the first redirecting unit and the second redirecting unit may be implemented by the processor and a communication interface in the network device. Of course, the processor needs to execute the program stored in the memory to implement the functions of the above program modules.

It is to be noted that the network device according to the above embodiment of FIG. 5 has been described above with reference to the division of the above program modules. In practical applications, the above processing can be allocated to different program modules as desired, i.e., the internal structure of the network device is divided into different program modules to perform all or part of the processing described above. In addition, the network device according to the above embodiment and the embodiment of the cell camping method on the network device side belong to the same concept, and for the specific implementation process, reference can be made to the method embodiment, and details thereof will be omitted here.

Figure 6:
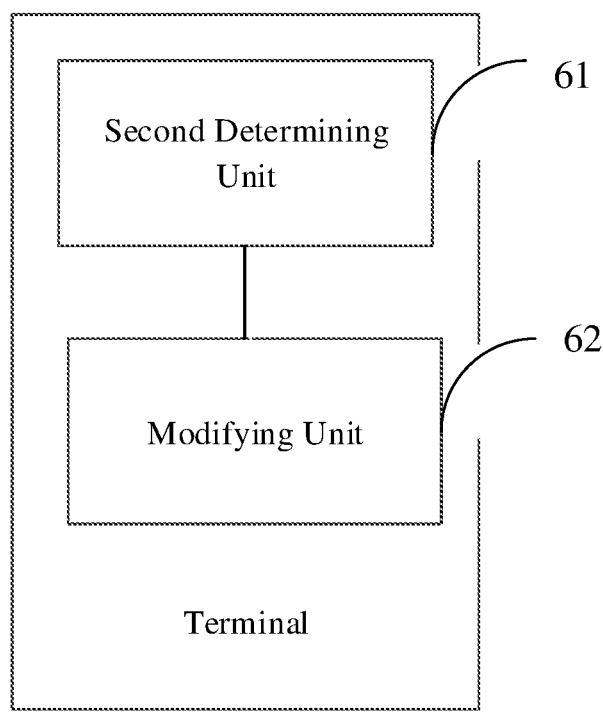
FIG. 6 is a schematic diagram showing a structure of a terminal according to an embodiment of the present disclosure.

In order to implement the cell camping method of the embodiment of the present disclosure, the embodiment of the present disclosure further provides a terminal. As shown in FIG. 6, the terminal includes: a second determining unit 61 configured to determine a cell where the terminal is camping and a corresponding camping state, the terminal being a terminal that supports an NSA networking function; and a modifying unit 62 configured to modify, when the terminal is camping on a first cell and is in an idle state, a reselection priority of the first cell into a first priority.

Here, the first priority is higher than or equal to a second priority, the second priority is a reselection priority of a second cell, and the first cell is an NSA anchor cell.

In an embodiment, the modifying unit 62 being configured to modify the reselection priority of the first cell into the first priority may include the modifying unit 62 being configured to: receive a first indication transmitted by a network device, the first indication indicating to the terminal that the reselection priority of the first cell is the first priority; and modify the reselection priority of the first cell into the first priority according to the first indication.

In an embodiment, the modifying unit 62 being configured to modify the reselection priority of the first cell into the first priority may further include the modifying unit 62 being configured to: trigger, by the terminal, a modification operation without receiving the first indication, to modify the reselection priority of the first cell into the first priority.

In an embodiment, the modification unit 62 may be further configured to: modify, by the terminal, the reselection priority of the first cell into the first priority in response to the terminal detecting neighbor information about the first cell while the terminal is camping on the second cell and is in an idle state.

In practical applications, the first determining unit 51, the third determining unit and the detecting unit may be implemented by a processor in the terminal, and the transmitting unit 52, the first redirecting unit and the second redirecting unit may be implemented by the processor and a communication interface in the network device. Of course, the processor needs to execute the program stored in the memory to implement the functions of the above program modules.

In practical applications, the second determining unit 61 and the modifying unit 62 may be implemented by a processor in the terminal. Of course, the processor needs to execute the program stored in the memory to implement the functions of the above program modules.

It is to be noted that, when the terminal according to the above embodiment of FIG. 6 performs cell camping, it has been described above with reference to the division of the above program modules. In practical applications, the above processing can be allocated to different program modules as desired, i.e., the internal structure of the terminal is divided into different program modules to perform all or part of the processing described above. In addition, the terminal according to the above embodiment and the embodiment of the cell camping method on the terminal side belong to the same concept, and for the specific implementation process, reference can be made to the method embodiment, and details thereof will be omitted here.

Figure 7:
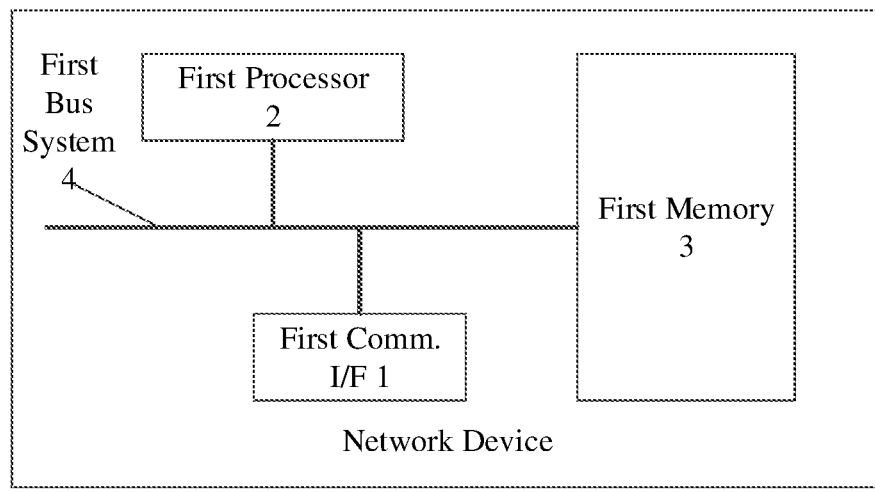
FIG. 7 is a schematic diagram showing a hardware structure of a network device according to an embodiment of the present disclosure.

Based on the hardware implementation of the above program modules, in order to implement the method of the embodiment of the present disclosure, an embodiment of the present disclosure further provides a network device. FIG. 7 is a schematic diagram showing a hardware structure of a network device according to an embodiment of the present disclosure. As shown in FIG. 7, the network device includes: a first communication interface 1, capable of information interaction with other devices such as terminals; a first processor 2, connected to the first communication interface 1 to implement information interaction with other devices, and configured to execute a computer program to perform the method according to any of one or more technical solutions on the network device side. The computer program is stored on a first memory 3.

Specifically, the first processor 2 is configured to determine a cell where a terminal is camping and a corresponding camping state, the terminal being a terminal that supports an NSA networking function.

The first communication interface 1 is configured to transmit a first indication to the terminal when the terminal is camping on a first cell and is in an idle state, the first indication indicating to the terminal that a reselection priority of the first cell is a first priority.

Here, the first priority is higher than or equal to a second priority, the second priority is a reselection priority of a second cell, and the first cell is an NSA anchor cell.

In an embodiment, the first processor 2 may be further configured to: determine, when the terminal is camping on the second cell and is in a connected state, a first parameter of the first cell, the first parameter representing a congestion condition of the first cell; and redirect, when the first parameter of the first cell satisfies a corresponding parameter threshold, the terminal to the first cell via the first communication interface 1.

In an embodiment, the first processor 2 being configured to determine the first parameter of the first cell may include the first processor 2 being configured to: determine a first number corresponding to the first cell, the first number being a number of terminals currently accessing the first cell; determine a second number corresponding to the first cell, the second number being a maximum number of terminals allowable to access the first cell; and determine the first parameter of the first cell based on the first number and the second number.

In an embodiment, the first processor 2 may be further configured to: detect, when the terminal is camping on the first cell and is in a connected state, a signal quality of the terminal to obtain a detection result; and redirect the terminal to the second cell via the first communication interface 1 when the detection result indicates that the signal quality is lower than a predetermined threshold for a time length exceeding a first predetermined time length.

In an embodiment, when redirecting the terminal to the second cell, the first processor 2 may be further configured to: prohibit the terminal from reselecting the first cell within a second predetermined time length; or refrain from redirecting the terminal to the first cell within the second predetermined time length.

In an embodiment, the first processor 2 being configured to determine the cell where the terminal is camping and the corresponding camping state may include the first processor 2 being configured to: search a predetermined list to determine whether the terminal supports the NSA function, to obtain a search result, the predetermined list recording support of the NSA function by each terminal within a coverage of a network device; and determine the cell where the terminal is camping and the corresponding camping state when the search result indicates that the terminal supports the NSA function.

Of course, in practical applications, various components in the network device are coupled together through a first bus system 4. It can be appreciated that the first bus system 4 is configured to provide the connection and communication between these components. In addition to a data bus, the first bus system 4 further includes a power bus, a control bus and a status signal bus. However, for the sake of clarity, the buses are marked as the first bus system 4 in FIG. 7.

Figure 8:
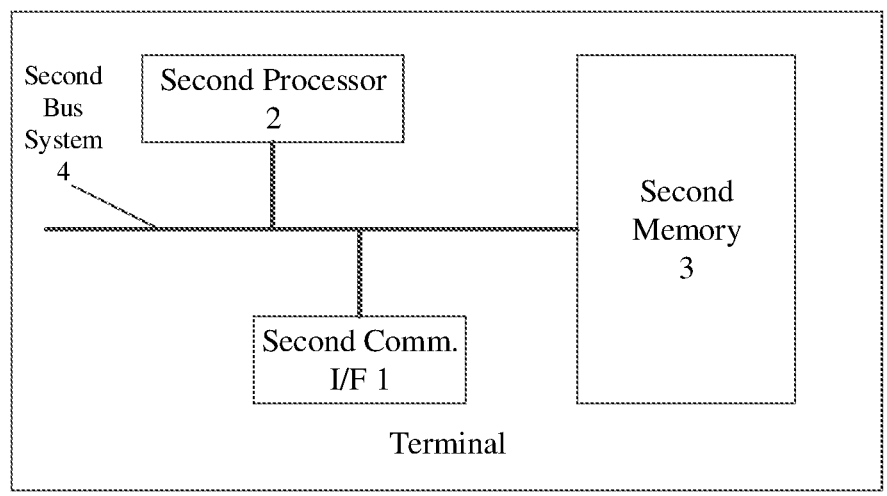
FIG. 8 is a schematic diagram showing a hardware structure of a terminal according to an embodiment of the present disclosure.

Based on the hardware implementation of the above program modules, in order to implement the method of the embodiment of the present disclosure, an embodiment of the present disclosure further provides a terminal. FIG. 8 is a schematic diagram showing a hardware structure of a terminal according to an embodiment of the present disclosure. As shown in FIG. 8, the terminal includes: a second communication interface 1, capable of information interaction with other devices such as network devices; a second processor 2, connected to the second communication interface 1 to implement information interaction with other devices, and configured to execute a computer program to perform the method according to any of one or more technical solutions on the terminal side. The computer program is stored on a second memory 3.

Specifically, the second processor 2 is configured to: determine a cell where the terminal is camping and a corresponding camping state, the terminal being a terminal that supports an NSA networking function; and modify, when the terminal is camping on a first cell and is in an idle state, a reselection priority of the first cell into a first priority.

Here, the first priority is higher than or equal to a second priority, the second priority is a reselection priority of a second cell, and the first cell is an NSA anchor cell.

In an embodiment, the second processor 2 being configured to modify the reselection priority of the first cell into the first priority may include the second processor 2 being configured to: receive a first indication transmitted by a network device via the second communication interface 1, the first indication indicating to the terminal that the reselection priority of the first cell is the first priority; and modify the reselection priority of the first cell into the first priority according to the first indication.

In an embodiment, the second processor 2 being configured to modify the reselection priority of the first cell into the first priority may include the second processor 2 being configured to: trigger a modification operation without receiving the first indication, to modify the reselection priority of the first cell into the first priority.

In an embodiment, the second processor 2 may be further configured to: modify the reselection priority of the first cell into the first priority in response to the terminal detecting neighbor information about the first cell while the terminal is camping on the second cell and is in an idle state.

Of course, in practical application, various components in the terminal are coupled together through a second bus system 4. It can be appreciated that the second bus system 4 is configured to provide the connection and communication between these components. In addition to a data bus, the second bus system 4 further includes a power bus, a control bus and a status signal bus. However, for the sake of clarity, the buses are marked as the second bus system 4 in FIG. 8.

The first memory or the second memory in the embodiments of the present disclosure is configured to store various types of data to support operations in related device. Examples of such data include: any computer program operative on the related device.

It can be appreciated that the memory may be a volatile memory or a non-volatile memory, and may also include both volatile and non-volatile memories. Here, the non-volatile memory can be a ROM, a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory (e.g., magnetic disk storage or magnetic tape storage), an optical disc, or a Compact Disc Read-Only Memory (CD-ROM). The volatile memory may be a Random Access Memory (RAM), which can be used as an external cache. As non-limiting examples, various forms of RAMs are available, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), or Direct Rambus Random Access Memory (DRRAM). The memory described in the embodiment of the present disclosure is intended to include, but not limited to, any of these and any other suitable types of memories.

The method disclosed in any of the embodiments of the present disclosure may be applied to the processor or implemented by the processor. The processor may be an integrated circuit chip with signal processing capabilities. In the implementation process, the steps of any of the above methods can be performed by a hardware integrated logic circuit in the processor or instructions in the form of software. The above processor may be a general-purpose processor, a Digital Signal Processor (DSP), or any other programmable logic device, discrete gate or transistor logic device, discrete hardware component, or the like. The processor may implement or execute the methods, steps, and logical block diagrams disclosed in the embodiments of the present disclosure. The general-purpose processor may be a microprocessor or any conventional processor or the like. The steps of the method disclosed in any of the embodiments of the present disclosure may be directly embodied as being executed and completed by a hardware decoding processor, or by a combination of hardware and software modules in the decoding processor. The software modules may be located in a storage medium, which may be provided in the memory. The processor reads a program from the memory and performs the steps of any of the methods in combination with its hardware.

The processor, when executing the program, implements the corresponding process in the method according to any of the embodiments of the present disclosure, and details thereof will be omitted here for brevity.

In an exemplary embodiment, an embodiment of the present disclosure further provides a storage medium, i.e., a computer storage medium, which may be specifically a computer-readable storage medium, including e.g., a memory for storing a computer program. The computer program can be executed by a processor to implement the steps described in any of the above methods. The computer-readable storage medium may be a memory such as FRAM, ROM, PROM, EPROM, EEPROM, Flash Memory, magnetic surface memory, optical disc, or CD-ROM.

In the embodiments of the present disclosure, it can be appreciated that the disclosed devices, terminals and methods may be implemented in other ways. The device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection between components as shown or discussed may be indirect coupling or communicative connection between devices or units via some interfaces which may be electrical, mechanical, or in any other forms.

The units described above as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may all be integrated into one processing unit, or alternatively be separate units, or two or more units may be integrated into one unit. The above integrated unit can be implemented in hardware or hardware plus software functional units.

It can be appreciated by those of ordinary skill in the art that all or part of the steps for implementing any of the above method embodiments may be performed by related hardware following program instructions. The program may be stored in a computer-readable storage medium, and the program, when executed, implements the steps of any of the above method embodiments. The storage medium may include various mediums that can store program codes, such as a removable storage device, a ROM, a RAM, a magnetic disk or an optical disc.

Alternatively, when implemented in the form of a software functional unit and sold or used as a standalone product, the above integrated unit of the present disclosure can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and include instructions to enable an electronic device, such as a personal computer, a server, or a network device, etc., to perform all or part of the method described in each of the embodiments of the present disclosure. The storage medium may include a mobile storage device, a ROM, a RAM, a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A cell camping method, comprising:
determining a cell where a terminal is camping and a corresponding camping state, the terminal being a terminal that supports a Non-Standalone networking (NSA) function; and
transmitting a first indication to the terminal when the terminal is camping on a first cell and is in an idle state, the first indication indicating to the terminal that a reselection priority of the first cell is a first priority,
wherein the first priority is higher than or equal to a second priority, the second priority is a reselection priority of a second cell, and the first cell is an NSA anchor cell,
wherein the method further comprises:
determining, when the terminal is camping on the second cell and is in a connected state, a first parameter of the first cell, the first parameter representing a congestion condition of the first cell; and
redirecting, when the first parameter of the first cell satisfies a corresponding parameter threshold, the terminal to the first cell,
wherein said determining the first parameter of the first cell comprises:
determining a first number corresponding to the first cell, the first number being a number of terminals currently accessing the first cell;
determining a second number corresponding to the first cell, the second number being a maximum number of terminals allowable to access the first cell; and
determining the first parameter of the first cell based on the first number and the second number.

2. The method according to claim 1, further comprising:
detecting, when the terminal is camping on the first cell and is in a connected state, a signal quality of the terminal to obtain a detection result; and
redirecting the terminal to the second cell when the detection result indicates that the signal quality is lower than a predetermined threshold for a time length exceeding a first predetermined time length.

3. The method according to claim 2, further comprising, when the terminal is redirected to the second cell:
prohibiting the terminal from reselecting the first cell within a second predetermined time length; or
refraining from redirecting the terminal to the first cell within the second predetermined time length.

4. The method according to claim 1, wherein said determining the cell where the terminal is camping and the corresponding camping state comprises:
searching a predetermined list to determine whether the terminal supports the NSA function, to obtain a search result, the predetermined list recording support of the NSA function by each terminal within a coverage of a network device; and
determining the cell where the terminal is camping and the corresponding camping state when the search result indicates that the terminal supports the NSA function.

5. A network device, comprising:
a first communication interface,
a first processor, and
a first memory having a computer program stored thereon and executable by the first processor,
wherein the first processor is configured to invoke and run the computer program whereby the network device is operative to:
determine a cell where a terminal is camping and a corresponding camping state, the terminal being a terminal that supports a Non-Standalone networking (NSA) function; and
transmit a first indication to the terminal when the terminal is camping on a first cell and is in an idle state, the first indication indicating to the terminal that a reselection priority of the first cell is a first priority,
wherein the first priority is higher than or equal to a second priority, the second priority is a reselection priority of a second cell, and the first cell is an NSA anchor cell,
wherein the first processor is further configured to invoke and run the computer program whereby the network device is operative to:
determine, when the terminal is camping on the second cell and is in a connected state, a first parameter of the first cell, the first parameter representing a congestion condition of the first cell; and
redirect, when the first parameter of the first cell satisfies a corresponding parameter threshold, the terminal to the first cell,
wherein said determining the first parameter of the first cell comprises:
determining a first number corresponding to the first cell, the first number being a number of terminals currently accessing the first cell;
determining a second number corresponding to the first cell, the second number being a maximum number of terminals allowable to access the first cell; and
determining the first parameter of the first cell based on the first number and the second number.

6. The network device according to claim 5, wherein the first processor is further configured to invoke and run the computer program whereby the network device is operative to:
detect, when the terminal is camping on the first cell and is in a connected state, a signal quality of the terminal to obtain a detection result; and
redirect the terminal to the second cell when the detection result indicates that the signal quality is lower than a predetermined threshold for a time length exceeding a first predetermined time length.

7. The network device according to claim 6, wherein the first processor is further configured to invoke and run the computer program whereby the network device is operative to, when the terminal is redirected to the second cell:
prohibit the terminal from reselecting the first cell within a second predetermined time length; or
refrain from redirecting the terminal to the first cell within the second predetermined time length.

8. The network device according to claim 5, wherein said determining the cell where the terminal is camping and the corresponding camping state comprises:
search a predetermined list to determine whether the terminal supports the NSA function, to obtain a search result, the predetermined list recording support of the NSA function by each terminal within a coverage of a network device; and
determine the cell where the terminal is camping and the corresponding camping state when the search result indicates that the terminal supports the NSA function.

* * * * *